(12) United States Patent
Mildner et al.

(10) Patent No.: US 8,764,035 B2
(45) Date of Patent: Jul. 1, 2014

(54) MOTOR VEHICLE

(75) Inventors: Udo Mildner, Limburg (DE); Stefan Gloger, Muehltal (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/274,883

(22) Filed: Oct. 17, 2011

(65) Prior Publication Data

US 2012/0091777 A1     Apr. 19, 2012

(30) Foreign Application Priority Data

Oct. 19, 2010   (DE) .................... 10 2010 048 846

(51) Int. Cl.
*B60G 9/00*   (2006.01)
*B60G 15/00*   (2006.01)

(52) U.S. Cl.
CPC ............. *B60G 9/003* (2013.01); *B60G 15/00* (2013.01)
USPC ........ 280/124.11; 280/124.121; 280/124.123; 280/124.147; 296/64

(58) Field of Classification Search
CPC .......... B60G 9/00; B60G 9/003; B60G 11/00; B60G 11/14; B60G 11/06; B60G 13/003; B60G 13/005; B60G 15/00; B60G 15/02; B60G 2206/01; B62D 21/11
USPC ...................... 280/124.11, 124.109, 124.121, 280/124.123, 124.141, 124.146, 124.147, 280/124.154, 781
See application file for complete search history.

(56) References Cited

U.S. PATENT DOCUMENTS

| | | | |
|---|---|---|---|
| 3,477,538 A |   | 11/1969 | Hall et al. |
| 3,486,763 A | * | 12/1969 | Hexel ............................ 280/788 |
| 5,558,360 A | * | 9/1996 | Lee ........................ 280/124.138 |
| 5,717,300 A |   | 2/1998 | Baloche et al. |
| 5,975,612 A | * | 11/1999 | Macey et al. .................... 296/66 |
| 6,109,631 A | * | 8/2000 | Jones et al. ............ 280/124.134 |
| 6,113,180 A |   | 9/2000 | Corporon et al. |
| 6,129,404 A | * | 10/2000 | Mattarella et al. ......... 296/65.09 |
| 6,170,847 B1 |   | 1/2001 | Pham |
| 6,209,205 B1 |   | 4/2001 | Rumpel et al. |
| 6,345,840 B1 |   | 2/2002 | Meyer et al. |
| 6,464,297 B2 | * | 10/2002 | Garrido et al. ........... 297/354.13 |

(Continued)

FOREIGN PATENT DOCUMENTS

| | | |
|---|---|---|
| DE | 69501048 T2 | 4/1998 |
| DE | 19811847 A1 | 9/1999 |

(Continued)

OTHER PUBLICATIONS

German Patent Office, German Search Report for Application 102010048846.1, dated Jul. 7, 2011.

(Continued)

*Primary Examiner* — James English
(74) *Attorney, Agent, or Firm* — Ingrassia Fisher & Lorenz, P.C.

(57) ABSTRACT

With a motor vehicle having a front axle and rear axle, underbody and shock absorbers, each of which extend between an upper point of action on the underbody and a control arm on the rear axle extending adjacent to a rear wheel, and at least one back seat the upper point of action of one of the shock absorbers is located vertically below the back seat.

16 Claims, 4 Drawing Sheets

(56) References Cited

U.S. PATENT DOCUMENTS

| | | |
|---|---|---|
| 7,066,539 B2 | 6/2006 | Hatta et al. |
| 7,243,934 B2 * | 7/2007 | Lee et al. ............... 280/124.128 |
| 7,252,318 B2 * | 8/2007 | Sumida et al. .................. 296/64 |
| 7,300,107 B2 * | 11/2007 | Kammerer .................... 297/336 |
| 7,325,820 B2 * | 2/2008 | Allen et al. .............. 280/124.15 |
| 7,380,859 B2 * | 6/2008 | Gardiner ......................... 296/64 |
| 7,686,367 B2 * | 3/2010 | Neale .............................. 296/64 |
| 7,748,766 B2 * | 7/2010 | Villeminey ..................... 296/64 |
| 7,762,604 B1 * | 7/2010 | Lindsay .......................... 296/64 |
| 8,251,426 B2 * | 8/2012 | Gerhardt .................... 296/65.01 |
| 2002/0180243 A1 | 12/2002 | Kosuge |
| 2005/0073174 A1 | 4/2005 | Yamaguchi et al. |
| 2007/0102914 A1 * | 5/2007 | Siebeneick .................... 280/788 |
| 2007/0216185 A1 * | 9/2007 | McMillen ....................... 296/64 |
| 2009/0179450 A1 | 7/2009 | Brown et al. |
| 2009/0236882 A1 * | 9/2009 | Yamada et al. ............. 297/216.1 |
| 2009/0267392 A1 | 10/2009 | Himmelhuber et al. |
| 2010/0026033 A1 * | 2/2010 | Homier et al. ............. 296/65.08 |
| 2011/0309650 A1 * | 12/2011 | Seibold et al. ............. 296/65.01 |

FOREIGN PATENT DOCUMENTS

| | | |
|---|---|---|
| DE | 19905363 C1 | 5/2000 |
| DE | 19916811 C1 | 5/2000 |
| DE | 10139412 A1 | 3/2003 |
| DE | 60219612 T2 | 1/2008 |
| DE | 102007015419 A1 | 10/2008 |
| GB | 969703 A | 9/1964 |
| GB | 2442716 A | 4/2008 |
| JP | 2006044366 A | 2/2006 |
| JP | 2007245910 A | 9/2007 |

OTHER PUBLICATIONS

UKIPO, British Search Report for Application No. 1117221.0, dated Jan. 27, 2012.

* cited by examiner

MOTOR VEHICLE

CROSS-REFERENCE TO RELATED APPLICATION

This application claims priority to German Patent Application No. 102010048846.1, filed Oct. 19, 2010, which is incorporated herein by reference in its entirety.

TECHNICAL FIELD

The technical field relates to a motor vehicle, and particularly, the construction of a body of a motor vehicle.

BACKGROUND

In modern motor vehicles, the wheel housings are recessed into the flanks of the body and the outer surfaces of the doors are flush with door sills extending below these, in order to be able to create as wide as possible a passenger cell with given overall width of the vehicle. The wheel housings projecting into the interior of the body substantially restrict the useful width in the passenger interior so that a second seat row arranged behind driver and co-driver seat is generally arranged in front of the rear wheel housings in order to be able to provide a comfortable width also for their seats.

Particularly in the case of vans, the region between the rear wheel housings, directly above the rear axle of the vehicle, has to be utilizable for accommodating passengers. However, as a result of the width of the passenger cell being restricted by the wheel housings here, a seat row arranged at this point can only provide either limited comfort or a smaller number of seats than a seat row located further to the front, which is not restricted in its width by the wheel housings.

At least one object is to state a motor vehicle, with which these disadvantages are eliminated or at least alleviated these disadvantages. In addition, other objects, desirable features and characteristics will become apparent from the subsequent summary and detailed description, and the appended claims, taken in conjunction with the accompanying drawings and this background.

SUMMARY

A motor vehicle is provided that has a front axle and a rear axle, an underbody and shock absorbers, each of which extend between an upper point of action on the underbody and a control arm on the rear axle adjacent to a rear wheel, and at least one back seat the upper point of action of one of the shock absorbers is located vertically below the back seat. Thus, the shock absorber does not restrict the space available for the back seat in lateral direction, and the spacing between a lateral edge of the back seat and a neighboring rear wheel can be made small. Because of this, it is possible in a vehicle with an overall width usual for passenger cars of not more than approximately 1800 millimeter to accommodate a row of back seats that is comfortably adequate for three persons with a width of approximately 1190 millimeter or more between the rear wheels. The row of back seats can be realized as a continuous seat bench, as a row of three individual seats or an individual and a double seat; in the case of the seat bench, a continuous backrest, three individual foldable backrests or a combination of one individual and one double backrest can be provided.

A possibility of accommodating the shock absorber without restricting the width that is utilizable for the back seats because of this is to install the shock absorber inclined against the vertical. Here, it has to be taken into account, however, that with inclined installation any compression of the shock absorber is also linked to a pivoting, and that the ratio between the force which the shock absorber exerts on the wheel in the vertical and the force acting in longitudinal direction of the shock absorber becomes ever more unfavorable the closer the orientation of the shock absorber comes to the horizontal. In order to achieve a satisfactory effect a shock absorber suitable for inclined installation should therefore have a resetting force that grows with the compression substantially more strongly than linearly.

In order to avoid this problem, the longitudinal axis of the shock absorber, along which the latter is compressed in the case of a shock, preferentially assumes an angle of a maximum of approximately 20° to the vertical. In order to be able to accommodate the shock absorber in an orientation under the back seat deviating little from the vertical it is advantageous with a motor vehicle whose underbody comprises two side members in the manner known per se if in each side member a passage is formed, through which one of the shock absorbers extends.

For the driving stability of the vehicle it is desirable that the underbody is not too far distant from the roadway. In order to achieve this objective and simultaneously accommodate the shock absorbers a dome can be practically formed on a top of each side member, which in each case forms the upper point of action of one of the shock absorbers. In order to achieve a large through-loading opening of the vehicle that is not restricted through the side members, a loading surface is arranged above the side members. The space available between the side members below this loading surface can be utilized for a stowage compartment.

In order that the domes restrict the space available in the passenger cell as little as possible it is practical if a dome in each case is located below a front region of the back seat. In this front region, the thickness of a cushion of the back seat can be made smaller than in a rear region, without this noticeably impairing the sitting comfort, and the dome can engage in the clearance resulting from the tapering of the cushion. In order to make possible a versatile utilization of the vehicle and particularly comfortable loading even with large-size luggage the back seat should be practically adjustable between a position of use and a folded-down position, in which it is flush with a loading surface following behind the back seat.

In order to achieve an elevation of the seat surface when adjusting the back seat from the folded-down position into the position of use a four-way joint can be provided, via which the back seat can be adjusted between the position of use and the folded-down position. In order to be able to adjust the seat from a substantially horizontal folded-down position into a comfortable yet space-saving position of use, in which a seat surface of the seat slopes to the rear, a front arm of the four-way joint can be practically made longer than a rear arm.

In order to improve the comfort for the user, a motor can be provided for driving the adjustment between the position of use and the folded-down position. A switch for controlling the operation of the motor can be accommodated in a luggage compartment following behind the seat. Thus, it is within easy reach for a user who reaches into the load compartment via an open tailgate. In order for the dome not to hinder an adjustment of the back seat into the folded-down position it is practical if a seat cushion of the back seat in the folded-down position is relocated behind the dome. A backrest of the back seat can be pivoted over the dome in the folded-down position in a space-saving manner.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
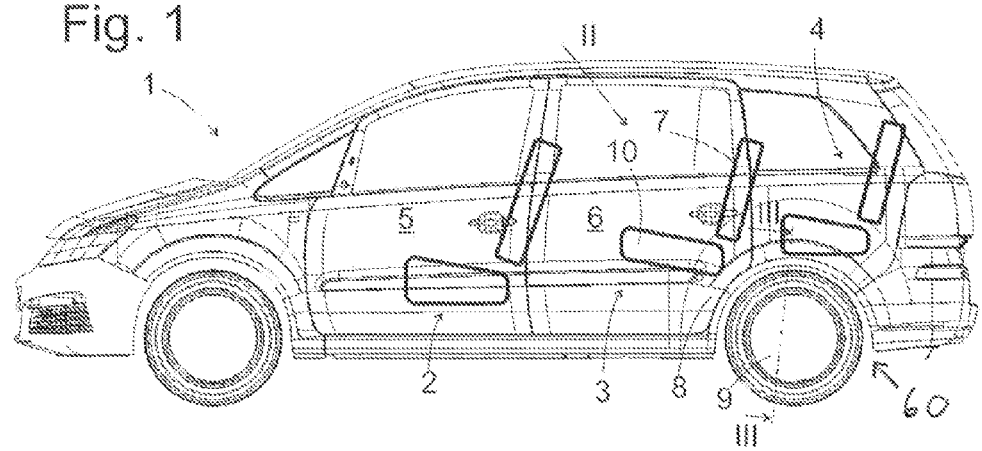
FIG. 1 is a lateral view of a motor vehicle with seats arranged in three rows one after the other.

FIG. 1 shows a lateral view of a motor vehicle 1, wherein the arrangement of seats 2, 3, 4 of a front, middle and a back seat row each is represented emphasized. The seats 2, 3 of the front and middle seat row are each accessible via associated front and rear doors 5, 6; in order to reach the seat 4 of the back seat row a passenger has to fold a backrest 7 of the seat 3 forward into a horizontal position so that he can climb over the seat 3, or move the entire seat 3 forward so that between the seat 3 and a wheel housing 8 of a rear wheel 9 projecting into the passenger cell a passage opens up.

The middle and the back seat row comprise two or three seats, 3 and 4 respectively, each. The backrests 7 of these seats 3, 4 can each be of the type that can be individually folded over; it is also conceivable that the backrests 7 of two neighboring seats 3 or 4 of a same seat row are interconnected and can be jointly folded over independently of a possible third seat of the same row, or that all backrests 7 of a row are interconnected. Since the width of the passenger cell at the height of the rear axle 60 (as shown in FIG. 3) is restricted through the wheel housings projecting to the inside from the left and right it is difficult at this point to provide adequate space so that three passengers can be comfortably seated next to one another. The embodiments make this possible through a special configuration of the rear floor structure of the motor vehicle body shown in FIG. 2.

Figure 2:
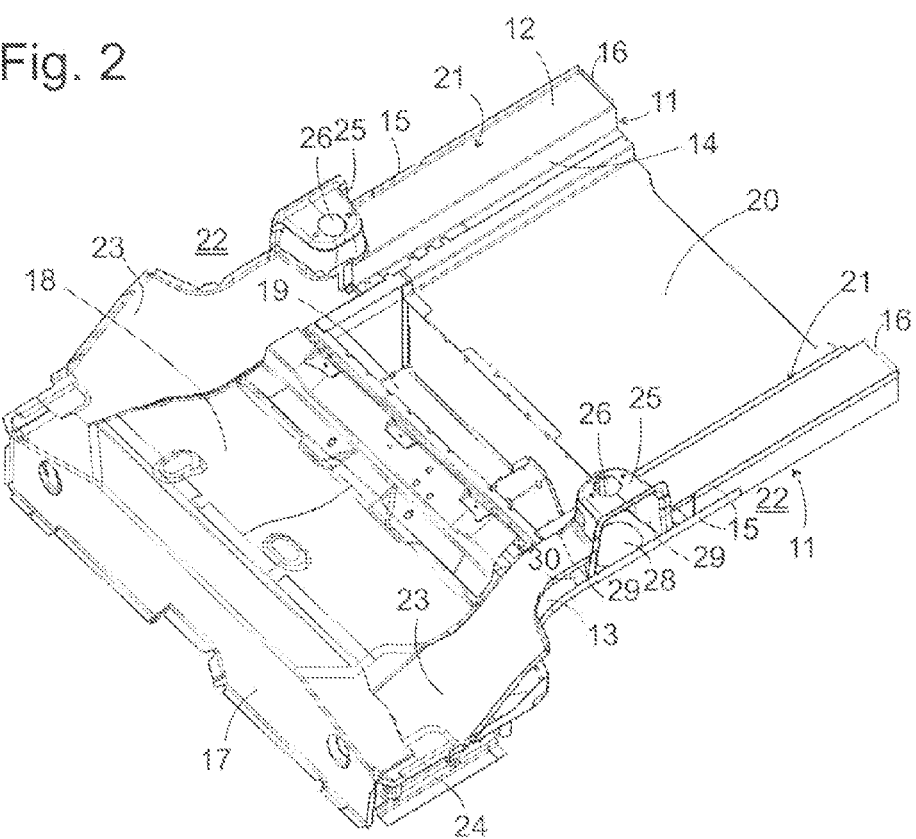
FIG. 2 is a perspective view of a rear floor structure of the motor vehicle from FIG. 1.
Figure 3:
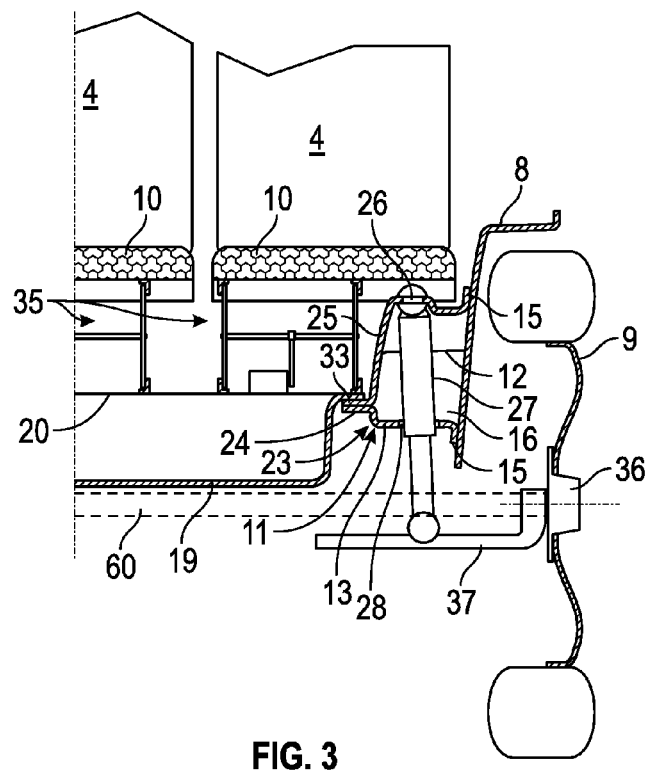
FIG. 3 is a schematic section along the plane III-III from FIG. 1.

FIG. 2 shows this floor structure in a perspective view obliquely from the front, which is seen from the direction of the arrow II of FIG. 1. Lateral flanks of this floor structure are formed by two side members 11. The two side members 11 are each profiles with a hat-shaped cross section each open towards the vehicle outside, which, as is in part more clearly visible in FIG. 3, each comprise a substantially horizontal upper wall 12, a lower wall 13, a side wall 14 connecting the walls 12, 13 and the webs 15 forming the rims of the hat-shaped cross section which are substantially vertical like the side wall 14. The side members 11 at their rear end each carry flanges 16 for fastening a bumper support which is not shown. A cross member 17, which interconnects the front ends of the side members 11, lies under the front edge of seat cushions 10 of the seat 3 of the middle seat row in the ready-assembled vehicle and forms a rear wall of the foot well for the passengers seated on these seats 3. A front floor panel 18 following the cross member 17 slopes towards the back on the one hand in order to create at its bottom a niche for accommodating a fuel tank, on the other hand, in order to again lower the floor level between the seats 3, 4 so far that adequate foot space is available to the passengers on the back seats 4.

Immediately below the seat surfaces of the seats 4 which are not shown in FIG. 2 a pan 19 is arranged, in which for example a starter battery can be accommodated. A rear floor panel 20 fills out the intermediate space between the pan 19 and the rear bumper support which is not shown. Linear, rear sections 21 of the side members 11 which are parallel to each other extend along clearances 22 which are provided in order to receive the wheel housings 8 which are not shown in FIG. 2. Front sections 23 of the side members 11 follow a divergent course from a front edge of the clearances 22 to the cross member 17 where they form grooves 24 that are open to the side, which are provided in order to receive the rear ends of door sills extending below the doors 5, 6 which are not shown.

While the lower wall 13 of the side members 11 along the clearance 22 substantially runs horizontally, the upper wall 12 locally forms a dome 25 curved upwards, which on its side facing the neighboring clearance 22 is partially open. An opening 26 in the apex of the dome 25 is provided in order to receive therein the head end of a shock absorber 27 as shown in FIG. 3, which acts on a rear wheel 9 of the vehicle 1 accommodated in the neighboring clearance 22. The body of the shock absorber 27 (not shown in FIG. 2) freely extends through an opening 28 cut into the lower wall 13. Before and behind the opening 28 one can see in FIG. 2 two sections of a support wall 29 which interconnects the walls 12, 13 extending the side walls of the cupola 25. An angled-off lower fastening flange 30 of the support wall 29 is welded to the lower wall 13. An upper edge of the support wall 29 contacts a base zone of the side wall of the cupola 25 from the inside and is welded together at this point. The support wall 29 can extend unitarily in an arc about the opening 28 and the shock absorber 27, or it can be divided into two sections, each of which cross the free cross section of the side member 11 and have an edge fastened to the side wall 14 of said side member.

FIG. 3 shows a schematic part cross section of the vehicle 1 and particularly its floor structure. The section plane of this Fig. designated III-III in FIG. 1 runs through the dome 25 of one of the side members 11 and shows the shock absorber 27 anchored therein. As is evident, the side member 11 is joined of two elongated elements 31, 32, of which the upper element 31 forms the upper wall 12 including the dome 25 and a part of the side wall 14 and the lower element 32 forms the lower wall 13 and the rest of the side wall 14. Both are interconnected at webs 33 projecting towards the vehicle center, which in turn serve as a support surface for an edge of the pan 19.

A wheel housing 8 is welded to the webs 15 of the elements 31 and 32 and the support wall 29. The wheel housing 8 closes off the open side of the side member 11, so that a dimensionally stable hollow profile with closed cross section is obtained. The dome 25, the support wall 29 extending it downwards and the opening 28 together form a pocket that is open towards the bottom, which accommodates a large part of the shock absorber 27. The shock absorber 27 therefore utilizes little or no space in the wheel housing 8, which permits keeping its width small. By using the space below a seat cushion 10 of a seat 4 of the back seat row for accommodating the shock absorber 27 the outer edge of this seat cushion 10 can move up except for a few centimeters against the rear wheel 9 surrounded by the wheel housing 8.

The seats 4 are supported on the rear floor panel 20 via four-way joints 35, which will be explained in more detail later on with respect to FIG. 6 and FIG. 7. The width of the row of seats 4 shown in FIG. 3 amounts to at least approximately 1190 mm. In order to be able to securely support the weight of the passengers and possible payload a tire width of approximately 225-235 mm is required. The wall thickness of the wheel housing 8 amounts to approximately 0.75 mm, that of an interior lining of the wheel housing (not shown) is approximately 3 mm, and the insulating layer located in between is approximately 12.5 mm. Taking into account a lateral freedom of movement of each rear wheel 9 of approximately 25 mm and approximately 5 mm tolerance, the following is obtained as minimum overall width of the vehicle: 1190 mm+2*(225-235 mm+0.75 mm+3 mm+12.5 mm+25 mm+5 mm)=1732.5-1742.5 mm. It is thus easily possible with the shown design to accommodate a seat row of approximately 1190 mm width in a vehicle with approximately 1800 mm overall width.

Figure 4:
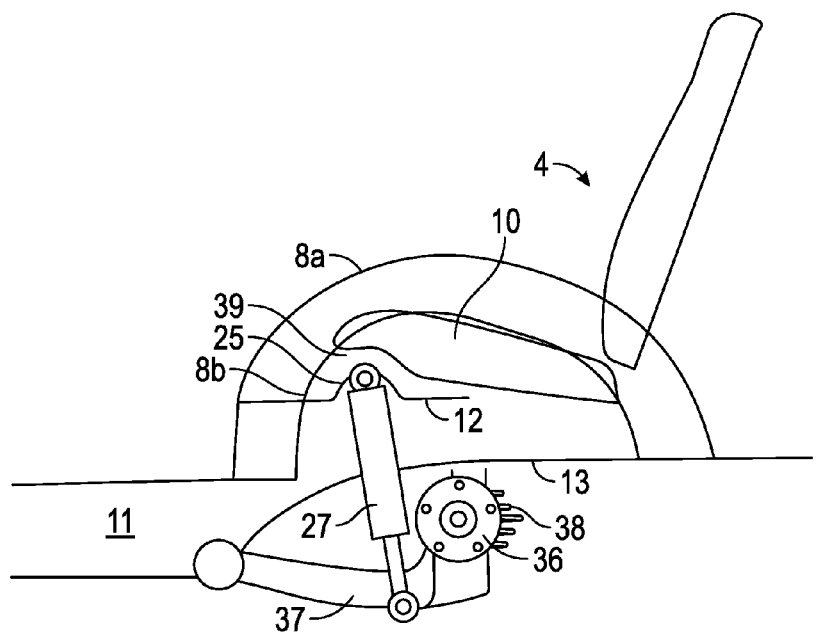
FIG. 4 is a schematic lateral view explaining the placement of a rear wheel suspension relative to a seat of the rear-most seat row.

FIG. 4 shows the arrangement of the seat 4, of the wheel housing 8, of the shock absorber 27 as well as of a hub 36 of the rear wheel 9 in a schematic lateral view. The shape of the wheel housing 8 is illustrated by two arcs 8a, 8b, wherein the outer arc 8a illustrates the circumferential course of the wheel housing in its region of largest diameter, all around the wheel 9, and the arc 8b the marginal course of a side wall of the wheel housing 8 facing the side member that is substantially flat. In the position of use of the seat 4 the arc 8b and the outline of the seat cushion 10 intersect in the lateral view of FIG. 4. A passenger seated on the seat cushion 10 is therefore not noticeably restricted in lateral direction by the wheel housing 8.

The hub 36 is interconnected with the side member 11 via a control arm 37 bent-through downwards, whose front end on the front edge of the wheel housing 8 is articulated on the side member 11 in a manner allowing pivoting about an axis running in vehicle transverse direction. Between a free end of the control arm 37 carrying the hub 36 and the lower wall 13 of the side member a coil spring 38 is arranged centrally below the seat cushion 10. The dome 25, on which the upper end of the shock absorber 27 is fastened, is arranged under a front edge of the seat cushion 10 and engages in a clearance 39 on the bottom of said cushion. The reduction of the cushion thickness in the front region of the seat cushion 10 resulting from this has no consequences to speak of regarding the sitting comfort, since the weight of a passenger quite predominantly rests on the rear region of the seat cushion 10 and the thighs of the passenger do not greatly deform the seat cushion 10 above the clearance 39 when its feet stand on the floor panel 18.

For the usage value of a vehicle 1 of the type shown in FIG. 1 it is important that it is possible to bring the seats 4 in a position of non-use in a space-saving manner so that the backward region of the passenger cell can be used as luggage space. The four-way joint 35, which upon non-use allows lowering the seats 4 in a space-saving manner, is shown in FIG. 4 in position of use. The four-way joint 35 comprises two rails 40 with L-shaped cross section fastened to the floor panel 20, L-shaped rails 42 fastened to a support panel 41 of the seat cushion 10 and front and rear control arms 43, 44 each extending between the rails 40, 42. The front control arms 43 are longer than the rear ones 44 and are displace ably articulated on the upper rails 42 each in an elongated hole 45. Because of this, it is possible to pivot the control arms 43, 44 into a position of non-use, in which the upper and lower rails 40, 42 bear directly against each other and the support panel 41 is pivoted from the position sloping to the back shown in FIG. 5 into a position that is substantially parallel to the floor panel 20 and simultaneously displaced to the rear.

The front control arms 43 are coupled to each other through a transverse rod 46, the disc spacing of which from a pivot access of the control arms 43 on the lower L-rails 40 corresponds to the length of the rear control arms 44. A corresponding transverse rod obscured in the Fig. through the support panel 41 connects the ends of the rear control arms 44 acting on the upper L-rails 42. Both transverse rods are connected through a coupling rod 47 orientated in vehicle longitudinal direction. A crank arm 49 that can be driven by an electric motor 48 acts on this coupling rod 47.

Switches for controlling the electric motor 48 can be provided at different points of the vehicle 1. A switch, which is provided in the interior of the passenger cell between a rear edge of the door 6 and the seat 4, allows a passenger entering or exiting to adjust the seat 4 in a comfortable manner. A switch, which is arranged in the luggage space of the vehicle 1 behind the backrest 7 in the position of use, facilitates lowering the seat 4 for a user in the process of loading the vehicle via the tailgate and who requires additional stowage space for these purposes.

Figure 6:
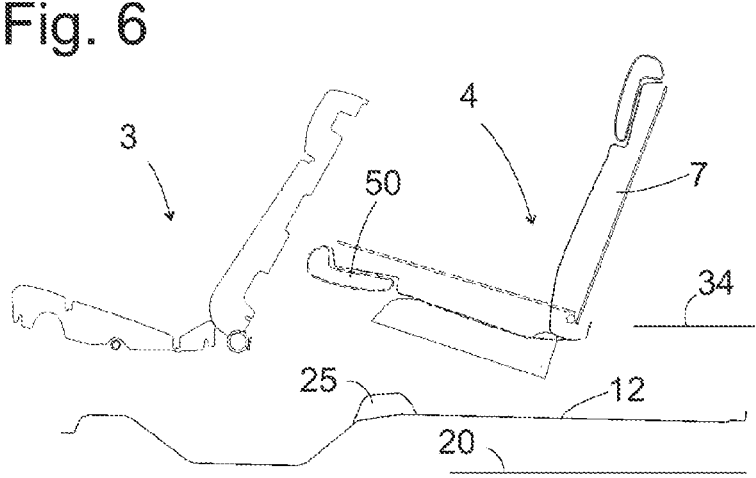
FIG. 6 is a schematic representation of the underbody of the vehicle and a seat each of the middle and the back seat row in position of use and in an intermediate position between position of use and folded-down position.

The lateral view of FIG. 6 shows a seat 3 of the middle seat row in position of use and the seat 4 with its seat cushion 10 in position of use and the backrest 7 in position of use as well as in an intermediate position folded down onto the seat cushion 10. A headrest 50 of the backrest 7 projects over a front edge of the seat cushion 10 in the intermediate position. The control arms 43, 44 guide the seat 4 to the back and down at the transition to the position of non-use and simultaneously pivot said seat slightly in anticlockwise direction at the same time so that when the seat has reached a completely folded-down position, in which its backrest 7 is flush with an intermediate floor 34 arranged behind the seats 4, the dome 25 engages in a clearance of the seat 4 delimited by the front edge of the seat cushion 10 and the headrest 50. Thus, the intermediate floor 34 and the back of the backrest 7 form a flat load surface. When all seats are in the folded-down position a load surface with large through-loading width is thus obtained that is restricted by the wheel housings 8 to a minor degree at worst.

Figure 5:
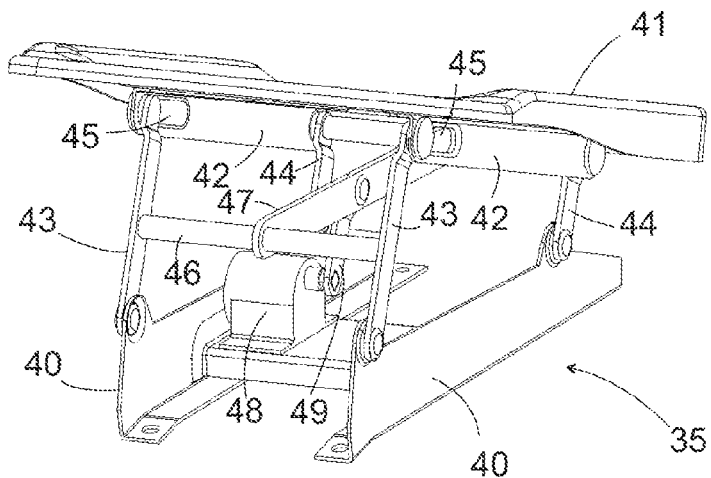
FIG. 5 is a perspective view of a support frame of a seat of the back seat row.
Figure 7:
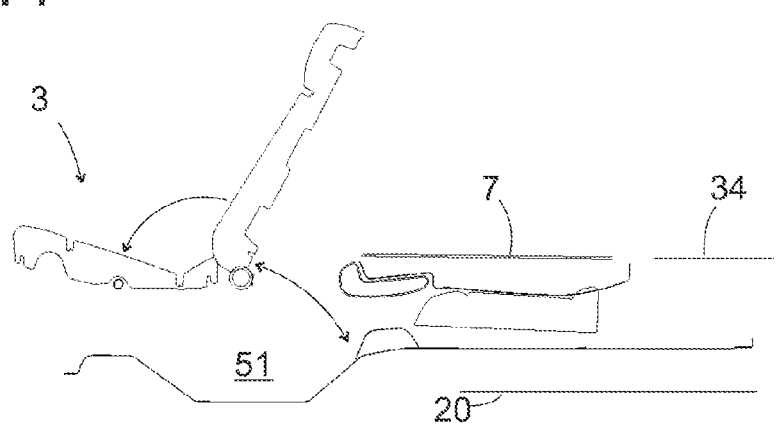
FIG. 7 is a view similar to FIG. 6 of the seat of the back seat row in folded-down position.

This load surface can still be extended towards the front in that not only the backrest 7 of the seat 3 is folded forward as described, but, as indicated in FIG. 7 by arrows, the seat 3 with backrest 7 folded forward, if required with the help of a similar four-way joint as shown in FIG. 5, is now folded-down into the foot space 51 in front of the seats 4 that is not now required. The intermediate floor 34 can be of the type that can be folded up so that a hollow space, which is located between said intermediate floor and the floor panel 20, is accessible and can be utilized as additional stowage space for a spare wheel or the like.

Figure 8:
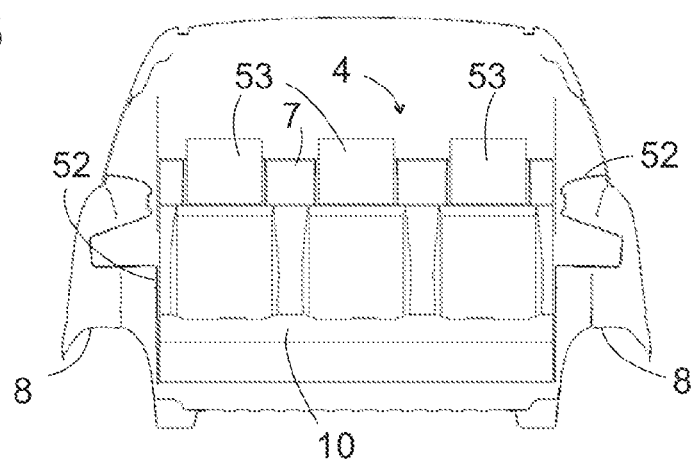
FIG. 8 is a cross section through the motor vehicle, which shows the third seat row of said motor vehicle in front view.

FIG. 8 shows a schematic cross section of the motor vehicle, in which the rear wheel housings 8 of said motor vehicle and interior linings 52 surrounding said wheel housings are shown in section and the back seat row in front view. The seat 4 in this case is realized as a seat bench, the seat cushion 10 and backrest 7 of which extend unitarily over a width of at least 1.190 mm from one interior lining 52 to the other. As is evident by the number of headrests 53, the seat bench is designed for three passengers.

Figure 9:
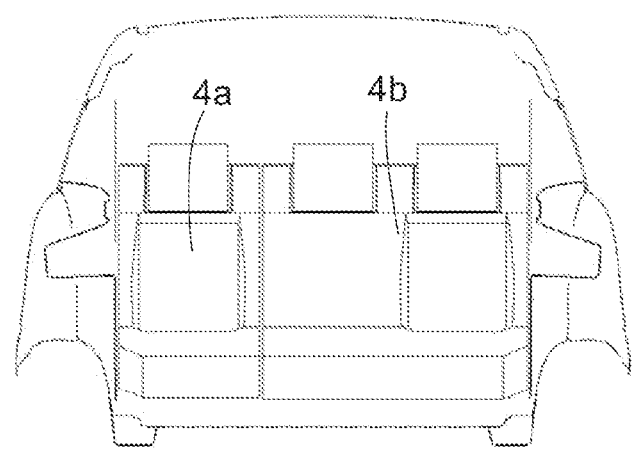
FIG. 9 is a section similar to FIG. 8, showing a second configuration of the third seat row.
Figure 10:
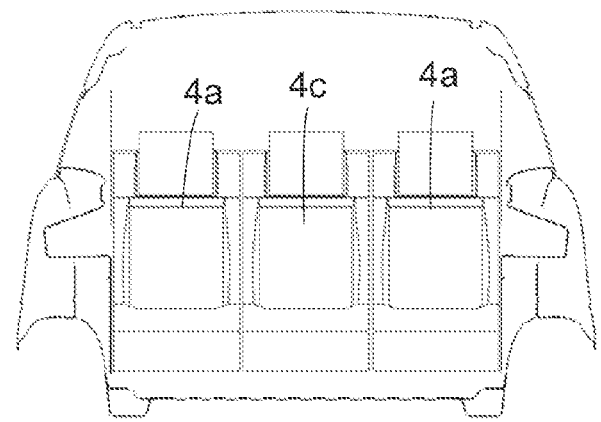
FIG. 10 is a section similar to FIG. 8, which shows a third configuration of the third seat row.

With the modification shown in FIG. 9 the seat row is divided into a single seat 4a and a double seat 4b, each of which have backrests 7 that can be folded over individually or which can be individually folded-down into the position of non-use. In the case of FIG. 10 three seats 4a, 4a, 4c are provided, each of which can be folded over individually or which can be folded-down into the position of non-use.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle, comprising:
a rear axle with a first end and a second end;
a wheel hub attached to each of the first end and the second end of the rear axle;
a control arm coupled to each wheel hub;
an underbody
a plurality of shock absorbers each extending between an upper point of action on the underbody and one of the control arms, each control arm coupled to one of the wheel hubs, wherein the underbody comprises two side members, each of the two side members comprise a lower horizontal surface which forms a passage through which extends one of the plurality shock absorbers; and
a back seat with, the upper point of action of one of the plurality of shock absorbers located vertically under the back seat.

2. The motor vehicle according to claim 1, wherein the back seat is part of a three-seater seat bench, a row of three individual seats or a row of an individual and a double seat.

3. The motor vehicle according to claim 1, wherein the back seat is part of a row of three individual seats.

4. The motor vehicle according to claim 1, wherein the back seat is part of a row of an individual and a double seat.

5. The motor vehicle according to claim 1, wherein a dome is formed in the upper point of action of one of the shock absorbers on a top of each of the two side members.

6. The motor vehicle according to claim 5, wherein a load surface extends over the dome.

7. The motor vehicle according to claim 6, wherein a stowage compartment is formed below the load surface between the two side members.

8. The motor vehicle according to claim 5, wherein the dome is located below a front region of the back seat.

9. The motor vehicle according to claim 8, wherein a seat cushion of the back seat is thinner in the front region than in a rear region.

10. The motor vehicle according to claim 8, wherein the back seat is adjustable between a position of use and a folded-down position that is substantially flush with a load surface following behind the back seat.

11. The motor vehicle according to claim 10, wherein the back seat is adjustable via a four-way joint between the position of use and the folded-down position.

12. The motor vehicle according to claim 11, wherein the four-way joint comprises a front control arm and a rear control arm that act on the back seat, and the front control arm is longer than the rear control arm.

13. The motor vehicle according to claim 10, further comprising a motor configured to drive an adjustment between the position of use and the folded-down position.

14. The motor vehicle according to claim 10, wherein a seat cushion of the back seat in the folded-down position is relocated behind the dome.

15. The motor vehicle according to claim 10, wherein a backrest of the back seat in the folded-down position is located above the dome.

16. A motor vehicle, comprising:
a rear axle with a first end and a second end;
a wheel hub attached to each of the first end and the second end of the rear axle;
a control arm coupled to each wheel hub;
an underbody;
a plurality of shock absorbers that each extending between an upper point of action on the underbody and one of the control arms coupled to the wheel hub, wherein a forward longitudinal axis of one of the plurality of shock absorbers assumes an angle of a maximum of approximately 20° to a vertical; and
a back seat with, the upper point of action of one of the plurality of shock absorbers located vertically under the back seat.

* * * * *